United States Patent [19]

Stengel

[11] Patent Number: 5,330,593
[45] Date of Patent: Jul. 19, 1994

[54] PROCESS AND APPARATUS FOR THE INDUCTIVE HARDENING OF ELONGATE WORKPIECES

[75] Inventor: Edgar Stengel, Remscheid, Fed. Rep. of Germany

[73] Assignee: AEG-Elotherm GmbH, Remscheid-Hasten, Fed. Rep. of Germany

[21] Appl. No.: 975,418

[22] Filed: Nov. 12, 1992

[30] Foreign Application Priority Data

Dec. 11, 1991 [DE] Fed. Rep. of Germany ....... 4140747
Oct. 6, 1992 [DE] Fed. Rep. of Germany ....... 4233530

[51] Int. Cl.[5] ............................................. C21D 1/10
[52] U.S. Cl. ................................... 148/572; 266/112; 266/129; 266/133
[58] Field of Search ................ 148/572, 573, 574; 266/112, 129, 133

[56] References Cited

U.S. PATENT DOCUMENTS 3,662,995  5/1972  Armstrong ........................ 148/572
3,944,446  3/1976  Bober ............................... 148/572

Primary Examiner—Deborah Yee
Attorney, Agent, or Firm—Meltzer, Lippe, Goldstein et al.

[57] ABSTRACT

The invention relates to a process and apparatus for the hardening of elongate workpieces by means of an inductor 19. The apparatus comprises a rotary ring 3 mounted to rotate around a horizontal axis in a hardening basin 1 and having a number of retaining devices 11 by means of which each of individual workpieces 16 is retained horizontally and rotatably around its longitudinal axis. To improve the hardening result and increase the degree of automation of the apparatus and process, associated with each retaining device 11 for connection to a central driving shaft 2 is an adjustable clutch-brake unit 7, and the retaining device 11 is drivable by the driving shaft 2 in a first position, is uncoupled from the driving shaft 2 and freely rotatable in a second position and is braked in relation to the rotary ring 3 in a third position. By these steps each of the workpieces 16 disposed on the rotary ring 3 can perform rotary movements independently of one another.

13 Claims, 1 Drawing Sheet

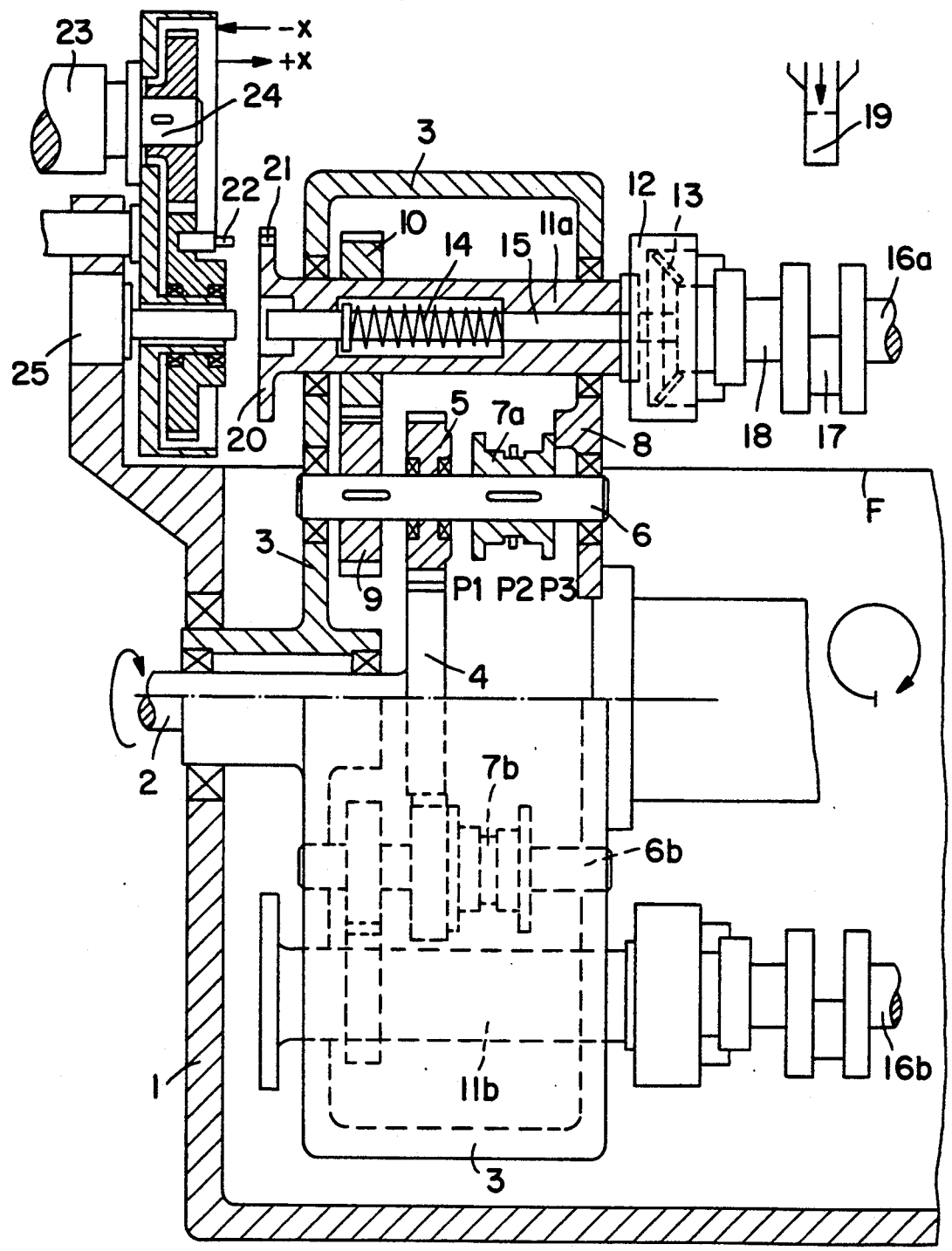

PROCESS AND APPARATUS FOR THE INDUCTIVE HARDENING OF ELONGATE WORKPIECES

The invention relates to a process and apparatus for the hardening of elongate workpieces by means of an inductor having: a rotating ring having a number of retaining devices by means of which each of individual workpieces is retained horizontally and rotatably around its longitudinal axis; and a driving shaft coupled to the drive for the retaining devices.

Such an apparatus is known from German PS 2343684. In that prior art apparatus a number of workpieces are retained horizontally in retaining devices of the rotary ring which can perform partial rotary movements in dependence on the number of workpieces, to move the workpiece from a position associated with the inductor, in which inductive heating is performed, into a quenching position in which the heated workpieces are quenched by immersion in the liquid introduced into the hardening basin.

In that prior art apparatus the individual retaining devices for various workpieces can be jointly driven by a central drive in the zone of the driving shaft. Until prior to the start of the inductive heating operation the inductor has reached its starting position in relation to the zone of the workpiece which is to be heated, the drive is stationary and is switched on when said position is reached, so that all the retaining devices on the rotary ring are set in rotation around the particular horizontal axis of the workpiece retained thereby. In practice it has been found that due to the interruption of the rotary motion, in a process of the kind specified the hardening result is unsatisfactory. Moreover, the prior art apparatus causes problems since it allows only a small degree of automation.

It is therefore an object of the invention so to further develop a process and apparatus of the kind specified as to achieve on the one hand an improved degree of automation and on the other hand also an enhancement of hardening quality.

This problem is solved in an apparatus according to the invention by the features that for connection to the driving shaft, associated with each retaining device is an adjustable clutch-brake unit, and the particular retaining device can be driven by the supporting shaft in a first position of the clutch-brake unit, is uncoupled from the supporting shaft and freely rotatable in a second position, and is braked in relation to a fixed stop on the rotary ring in a third position.

This problem is solved in a process of the kind specified by the feature that prior to heating, the workpiece is rotated into an initial angular position predetermined for the start of the heating operation, and during heating and quenching the workpiece is kept in a continuous rotary motion.

In comparison with the prior art, the known apparatus is further developed according to the invention by the feature that the top workpiece can be stopped or rotated separately. It has been found that the hardening properties of the workpiece can clearly be improved by the continuation of its rotary motion unaltered up to the completion of the quenching operation. The uncoupling of the rotary movements of the individual workpieces from one another now enables greater flexibility to be achieved as well as better adaptation to the technologically advantageous process conditions. The uncoupling of the individual retaining devices in regard to their rotary drive enhances the degree of automation of the hardening apparatus. This is also made possible by the feature that prior to heating the workpiece is rotated into a clearly-defined initial angular position, so that reproducible starting conditions are obtained for each workpiece.

In an advantageous embodiment of the apparatus according to the invention, the clutch-brake unit can be operated by an operating member which can be moved into three positions and which is disposed axially displaceably and non-rotatably on the shaft of planetary gear wheel meshing with a sun wheel coupled to the driving shaft. While operating parts of conventional clutch-brake combinations have only two states, namely the engaged state and the braked state, in a variant according to the invention the operating part is equipped for a third function.

To move the operating part into the required position, said part can be positioned by means of an axial adjusting drive. Malfunctions are avoided, due to the satisfactory reproducibility of the axial drives, which can be obtained as standard components.

A decisive feature for the quality of the hardening process is the initial angular position in which the elongate workpiece is positioned in relation to the inductor. The invention therefore provides an ancillary rotary drive which can be coupled at an accurate angle to the retaining device at the top of the rotary ring—i.e., the device associated with the inductor. When an operator or a charging device has first inserted the workpiece with an accurate angle into the retaining device, the angular position of the workpiece produced thereby being transferred in a clearly-defined manner to the ancillary rotary drive, a workpiece is rotated into a predetermined angular position prior to heating. The ancillary rotary drive can detect the angular position in which the workpiece is situated and can therefore reproducibly adjust for the following workpieces also the most favourable initial angular position for inductive heating which has been tried out on a sample workpiece.

Precise transference of the angular position is ensured by the feature that the ancillary rotary drive can be coupled in solely precisely one position along the periphery of a flange of the retaining device.

To enable the ancillary rotary drive to be coupled in a simple manner to the retaining device, the ancillary rotary drive can be moved axially in relation to the retaining device. Conveniently, the ancillary rotary drive is coupled to the top retaining device via a fitting pin engaging in a fitting bore of a flange part of the retaining device. To compensate for radial tolerances, conveniently the fitting bore takes the form of a slot extending radially in the flange part.

A further preferred feature of the invention is that the retaining device has clamping means for the workpiece. As a result, the workpiece can be very simply secured in its precise angular position in the retaining device.

Preferably the clamping means comprises clamping jaws and a compression-spring-actuated wedge transmission, thus ensuring on the one hand a rapid clamping operation and on the other the secure retention of the comparatively heavy workpiece. Moreover, one very simple feature is that the wedge transmission is actuated by a thrust rod actuated by a hydraulic feed cylinder engaging with the outside of the hardening casing.

A preferred use of the apparatus according to the invention is for the hardening of crankshafts.

Having regard to a precise determination of the initial angular position for the start of the heating operation, the initial angular position selected is conveniently the bottom position of the stroke bearing of the crankshaft.

An embodiment of the invention will now be explained in greater detail with reference to the drawing.

The top part of the single drawing is a section through a crankshaft hardening apparatus according to the invention. The lower part of the drawing sketches out the remaining construction of the apparatus.

A crankshaft hardening apparatus comprises a casing 1 which is constructed in the form of a hardening basin and in which a driving shaft 2 is pivotably mounted. The driving shaft 2 extends horizontally to the level F of a liquid introduced into the hardening basin 1. A rotary ring 3 is also rotatably mounted in the casing 1.

The rotary ring 3 comprises a central hub, which can be coupled to a drive (not shown), and a number of retaining devices 11 corresponding to the number of workpieces 16 to be retained in the apparatus. The embodiment illustrated has two retaining devices 11a and 11b which are offset by 180° in relation to one another in the rotary ring 3. The circular symbol shown in the right-hand central part of the drawing indicates how the rotary ring 3 can be so rotated around the central axis that the retaining devices 11a and b shown can interchange their positions.

As a result, the workpiece 16a as shown clamped at the top into the retaining device 11a moves into the position of the workpiece 16b shown at the bottom of the drawing and conversely.

A rotary drive for each of the individual retaining devices 11 is accommodated inside the rotary ring 3. Each drive consists firstly of the driving shaft 2 which is common to all the drives and which is rotatably mounted inside the rotary ring 3 and coupled to a sun wheel 4 meshing with planet wheels 5 forming part of a transmission via which the drive is transmitted from the supporting shaft 2 to the retaining device 11. Clearly, a separate transmission for coupling to the central drive via the supporting shaft 2 must be provided for each retaining device 11.

The first planet wheel 5 is mounted axially fixed and rotatably on a clutch shaft 6 on which a second planet wheel 9 and a clutch-brake unit 7 are disposed. A second planet wheel 9 is connected axially rigidly and non-rotatably to the clutch shaft 6, while the clutch-brake unit 7 is disposed non-rotatably but axially movably on the clutch shaft 6.

The clutch-brake unit 7 can take up the three positions P1, P2, P3 illustrated. In the left-hand position P1 the unit 7 is positively or non-positively coupled to the first planet wheel 5, while in the right-hand position P3 it is frictionally connected to a stop 8 in the rotary ring 3, and in the central position P2 it is connected neither to the first planet wheel 5 nor to the stop 8.

Each of the positions P1, P2, P3 of the clutch-brake unit can be adjusted from outside by an axial positioning drive (not shown).

The second planet wheel 9 meshes with a driving pinion 10 which is connected to the retaining device 11. On its side adjacent the casing 1, each retaining device 11 bears a flange 20 whose end face is formed with a radially extending slot 21.

Disposed fixed on the casing 1 opposite the flange 20 of the retaining device 11 is an ancillary rotary drive 23 which can be moved via an axial drive (not shown) by a predetermined travel x in relation to the flange 20. The ancillary rotary drive 23 has a transmission 24 comprising a disc on which a fitting pin 22 is provided. The disc with the fitting pin 22 rotates concentrically of the axis of the retaining device 11.

Disposed concentrically of the disc with the fitting pin 2 is a hydraulic adjusting cylinder 25 which can be advanced in a bore in the flange 20 of the retaining device 11. Disposed in the bore of the flange 20 is a feed rod 15 which bears against a compression spring 14 inside the retaining device.

The thrust rod terminates on that side of the retaining device which is adjacent the workpiece 16 in a wedge transmission 13 via which clamping jaws 12 can be moved to receive one end of the workpiece 16.

An inductor 19 which can be moved (in the direction of the arrow) by driving means (not shown) disposed above the or each surface 17, 18 of the workpiece 16 to be processed.

The operation of the apparatus according to the invention will now be described in greater detail:

First the workpieces, for example, crankshafts, are inserted at the correct angle into the particular retaining devices. For this purpose the clutch-brake unit 7 is first moved into position P3—i.e., the retaining device 11 is blocked in relation to the rotary ring 3.

Then the ancillary rotary drive 23 is moved by the distance X in the direction of the flange 20, and the disc with the fitting pin 22 is moved by the actuation of the ancillary rotary drive 23 concentrically in relation to the workpiece axis and the axis of the retaining device 11, until it moves into the fitting bore 21.

Then the retaining device is moved into the reference angular position by means of the ancillary rotary drive 23 and the workpieces introduced.

Prior to the insertion of the following workpiece, first the ancillary rotary drive 23 is uncoupled from the flange 20 by the distance X. After the clutch-brake unit 7 has been released from position P3 and entered position P2, the rotary ring 3 is rotated by one division—i.e., in the present case by 180°—, so that the retaining devices 11a and 11b interchange their positions. Then, as described hereinbefore, the ancillary drive 23 is coupled to the retaining device 11b and its reference angle position is adjusted before the workpiece associated with the retaining device 11b is inserted.

The workpieces 16a; 16b are clamped via clamping means 12, 13. Before the start of the clamping operation, the hydraulic adjusting cylinder 25 is disposed inside the bore in the flange part 20 of the retaining device 11a; 11b and acts on the thrust rod 15 against the force of the compression spring 14. The moving of the adjusting drive 25 (to the left) out of the bore into the position shown in the drawing produces the clamping operation, so that the workpiece 16, 16b remains clamped after the removal of the adjusting cylinder 25.

Insertion at the correct angle is followed by the heating operation. For this purpose the workpiece must first be moved into the starting position, which is preferably the lowest position of the stroke bearing 17 in the case of crankshafts. The initial angular position is adjusted via the ancillary rotary drive 23, the clutch-brake unit 7 being disposed in the freely rotatable position P2. Then the clutch-brake unit is moved into the blocking position P3, while the inductor 19 is guided to the surface 17 to be processed by a drive which is not shown. Simultaneously, or even before, the ancillary rotary drive 23 is removed from the flange part 20 by an axial movement around a distance X.

Then the clutch-brake unit 7 is moved out of the blocking position P3 into the position P1, in which the driving force of the supporting shaft 2 is transmitted via the sun wheel 4, the first planet wheel 5 and the second planet wheel 9 to the driving pinion 10 of the retaining device 11a.

After the heating operation has been performed by the inductor 19, the inductor is lifted off the workpiece oppositely to the direction of the arrow and the rotary ring 3 is rotated by one division—i.e., 180°—, while the rotary movement of the workpiece 16 is maintained, so that the workpiece 16 is immersed as it rotates into the quenching bath.

The previously processed workpiece continues to rotate even when the aforedescribed orientation and processing of the workpiece 16b shown at the bottom of the drawing is performed by means of the inductor 19.

The aforedescribed process can be performed practically fully automated, since both the position of the clutch-brake unit 7 and also the adjustment of the ancillary drive 23 and the feed of the inductor 19 can be coordinated with one another via a central control unit.

I claim:

1. An apparatus for induction hardening of elongate workpieces, comprising a rotary ring having a plurality of retaining devices, each of said retaining devices retaining one of said workpieces horizontally and rotatably about a longitudinal axis, a drive unit for rotatably driving said retaining devices, a drive shaft coupled to said drive unit, and a three-position adjustable clutch-brake unit associated with each of said retaining devices, each adjustable clutch-brake unit being disposed between its associated retaining device and said drive shaft, each adjustable clutch-brake unit having a first position wherein the associated retaining device is driven by said drive shaft, a second position wherein the associated retaining device is uncoupled from said drive shaft and is freely rotatable, and a third position wherein the associated retaining device is braked against a fixed stop on said rotary ring.

2. The apparatus of claim 1 further comprising a clutch shaft on which said adjustable clutch-brake unit is non-rotatably mounted, said clutch-brake unit being axially displaceable along said clutch shaft into said three positions, a sun wheel coupled to said drive shaft, and a planetary gear wheel mounted on said clutch shaft and meshing with said sun wheel.

3. The apparatus of claim 2 wherein said adjustable clutch-brake unit is axially displaceable along said clutch shaft by means of an axial adjusting drive.

4. The apparatus of claim 1 further comprising an ancillary rotary drive and a coupling unit for coupling said ancillary rotary drive to a top one of said retaining devices so that said top one of said rotary devices can be brought to a predetermined angular position for the start of inductive heating.

5. The apparatus of claim 4 wherein said ancillary rotary drive is axially movable relative to said top one of said retaining devices.

6. The apparatus of claim 4 wherein said coupling unit comprises a flange on said retaining device, said flange having a fitting bore therein, and a pin on said ancillary rotary drive which fits into said fitting bore.

7. The apparatus of claim 6 wherein said fitting bore comprises a slot extending radially in said flange.

8. The apparatus of claim 1 wherein each of said retaining devices includes clamping means for receiving a workpiece.

9. The apparatus of claim 8 wherein said clamping means comprises clamping jaws having a wedge transmission and a compression spring urging said clamping jaws to receive said workpiece.

10. The apparatus of claim 9 wherein said compression spring actuated wedge transmission includes a thrust rod which is guided axially in said retaining device and a feed cylinder which acts upon said retaining device.

11. The apparatus of claim 1 wherein said workpieces are crankshafts.

12. A process for induction hardening of elongate workpieces, comprising retaining said elongate workpieces in a rotary ring horizontally in relation to a liquid level contained in a hardening basin, rotating an individual one of said workpieces in a movement which is separate from said other workpieces into an initial angular position, said initial angular position, and rotating said one of said workpieces to a position located below said liquid level thereby quenching said one of said workpieces, wherein said workpieces are kept in continuous rotary motion by means of said rotary ring throughout said process.

13. The process of claim 12 wherein said workpieces comprise crankshafts, and wherein said initial angular position comprises the lowest position of a stroke bearing of a top one of said crankshafts.

* * * * *